(12) United States Patent
Grover et al.

(10) Patent No.: US 6,282,700 B1
(45) Date of Patent: Aug. 28, 2001

(54) MECHANISM FOR MAINTAINING REVISIONS OF OBJECTS IN FLASH MEMORY

(75) Inventors: Rajiv K. Grover, Roseville; Thomas A. Keaveny, Auburn, both of CA (US)

(73) Assignee: Hewlett Packard Company, Palo Alto, CA (US)

( * ) Notice: Subject to any disclaimer, the term of this patent is extended or adjusted under 35 U.S.C. 154(b) by 0 days.

(21) Appl. No.: 09/083,370

(22) Filed: May 21, 1998

(51) Int. Cl.$^7$ .................................................. G06F 9/45
(52) U.S. Cl. ........................ 717/3; 711/110; 711/217; 711/218; 711/219
(58) Field of Search .................... 395/703; 707/202; 709/203; 710/5; 711/162, 110, 217, 218, 219; 714/38; 717/3

(56) References Cited

U.S. PATENT DOCUMENTS

| | | | |
|---|---|---|---|
| 5,043,871 | * | 8/1991 | Nishigaki et al. .................... 707/202 |
| 5,606,660 | * | 2/1997 | Estakhri et al. ........................ 714/38 |
| 5,640,592 | * | 6/1997 | Rao ........................................... 710/5 |
| 5,640,608 | * | 6/1997 | Dockter et al. ....................... 709/203 |
| 5,987,575 | * | 11/1999 | Yamaguchi ........................... 711/162 |

OTHER PUBLICATIONS

Cormen et al., Introduction to Algorithms, MIT Press, Mar. 1990.*

Goodman–Miller, A Programmer's View of Computer Architecture, Oxford University Press, Mar. 1990.*

\* cited by examiner

*Primary Examiner*—Mark R. Powell
*Assistant Examiner*—Hoang-Vu Anthony Nguyen-Ba

(57) ABSTRACT

The inventive state mechanism assigns N+1 tags to N versions of an object stored in N memory areas. Thus, one tag is unused. An additional tag is used as a null or uninitialized tag. The other tags are assigned in a particular precedence order to revisions as they are stored. Thus, each assigned tag, except the null tag, has both a unique predecessor as well as a unique successor tag. The last tag of the sequence is lower in precedence to the first tag of the sequence, and this forms the cyclic relationship. The unused tag is used to determine the tag that is to be assigned to the next revision. The unused tag is also used to determine which revision is the most current revision. The inventive state mechanism is used by a memory management controller in maintaining the revisions.

26 Claims, 2 Drawing Sheets

MECHANISM FOR MAINTAINING REVISIONS OF OBJECTS IN FLASH MEMORY

REFERENCE TO RELATED APPLICATIONS

The present application is being concurrently filed with commonly assigned U.S. patent application, Ser. No. 09/083,371 entitled "DATA STRUCTURE SYNTHESIS IN HARDWARE USING MEMORY TRANSACTION TRANSLATION TECHNIQUES", the disclosure of which is incorporated herein by reference; and concurrently filed with commonly assigned U.S. patent application, Ser. No. 09/082,738 entitled "HIGH PERFORMANCE, NETWORK/BUS MULTIPLEXER ARCHITECTURE ", the disclosure of which is incorporated herein by reference.

TECHNICAL FIELD OF THE INVENTION

This application relates in general to flash, non-volatile memory, and in specific to a mechanism that maintains multiple updates of an object in the memory without regard to a number of updates of the object by using a cyclic tagging mechanism.

BACKGROUND OF THE INVENTION

Flash memory, or memory which can be electronically erased and reprogrammed, is also known as EEPROM. Flash memory, which unlike ordinary RAM, does not lose the stored information upon a power off condition. Many products or designs maintain objects, and their revisions, including program code, login data, operating parameters, usage settings, and firmware, in flash memory, to allow these objects to be changed during use, but retained after loss of power. Flash memory is typically used in PC BIOS initialization operations. Most products that embed such objects offer facilities for replacing or modifying their contents. For example, the operating firmware for a given device, such as a magnetic disk, may be updated.

A problem arises during a flash update, in that the update process may not complete. Thus, the updated revision may be incomplete, and unusable. If the system only maintains a single copy in a single allocated storage area, meaning that no prior versions exist, then the system can suffer loss of state if an error occurs while the object is being replaced.

A prior art alternative to the single copy mechanism is to maintain prior versions of the object. However, updating these objects can cause multiple revisions of objects to be present, and thus requires a mechanism to determine which object is valid and should be used. Typically, a version is considered valid if it is the most recent, complete version. The second mechanism has a larger storage area, in which multiple revisions of the object may be maintained, where only one is active, usually the valid version. The prior art assigns each version a tag which is incremented via a counter after each assignment. During initialization of the system, a software algorithm examines the tags, and thus determines which object to activate.

However, such implementations that store multiple revisions using a finite revision tags have problems when the revision tag reaches its maximal value. The next tag value is then the lowest tag, and thus, the most recent version is tagged with the lowest value tag, and since applications assume that the highest tag value represents the most recent version, the most recent version will not be used during system operations. This is known as rollover effects. Note that the tags are represented by a fixed field, and the tag is usually an index or revision number, or a date code. These tag fields are limited in that they have an inherent maximum value, due to the physical size of the storage allocated for maintaining the tag field. The consequence of this bounded tags and rollover effects is that revision management algorithms may generate indeterminate, and hence incorrect, results.

Therefore, there is a need in the art for a mechanism that will allow multiple versions of objects to be stored in a non-volatile memory without the rollover limitations of bounded tags.

SUMMARY OF THE INVENTION

These and other objects, features and technical advantages are achieved by a system and method which uses a cyclic tagging mechanism or state mechanism that permits the location of the latest object revision, (as well as its predecessors) and eliminates boundary condition constraints.

The inventive state mechanism uses a particular number of predetermined tags, which are recycled as they are assigned to new versions of the object. If there are a total of N versions or revisions to be stored in N storage areas, then N+2 tags are required. One tag is used a null or uninitialized tag. The remaining tags are assigned in a particular precedence order to revisions of the object as they arrive. Thus, each assigned tag, except the null tag, has both a unique predecessor as well as a unique successor tag. This forms the cyclic relationship. Note that this inventive mechanism assumes that a finite number of object revisions can be stored at any one time, such that storage areas associated with the objects are not infinite in nature.

The inventive state mechanism is used by a memory management controller in assigning the tags to the revisions. The state mechanism determines the tag that is to be assigned to the next revision. The precedence order of the tags allows the memory management controller to determine which revision is the most current revision. For example, if there are two storage areas, then four tags are required. One tag is used for the null state, and the remaining tags are assigned to the revisions. With only two revision stored at any one time, one tag is unused. The unused tag is used to determine the subsequent tag and the precedent tag. The subsequent tag of the sequence which would be used for the next revision is the unused tag. The tag with the highest precedence of the two assigned tags, is the tag lower in precedence to the unused tag. Another way of viewing this mechanism is that a review of the assigned tags will reveal the object tag whose successor tag is not currently assigned (i.e., unused). The object tagged in this manner is the current revision. Similarly, a tagged object that has no currently assigned predecessor is the oldest revision. Revising objects is a process of deactivating the oldest object and its tag, replacing its contents, and then assigning it the next successor tag in the cycle. The previously assigned object tag is then reclaimed, and by convention and design, represents the next unused tag in the cycle of succession.

Therefore, it is a technical advantage of the invention to allow multiple revisions of an object to be stored with a limited number of tags and not incurring problems from counter overflows or rollover of tags.

It is another technical advantage of the invention to store multiple revisions and thereby eliminate the problems associated with storing a single version of the object, such as loss of state during an update.

It is a further technical advantage of the invention to apply an unbounded, cyclic code tag to each object revision stored in memory.

It is a further technical advantage of the invention to determine the most recent, valid revision of a known memory object based on the cyclic code tag.

It is a further technical advantage of the invention to generate the next cyclic tag in sequence to apply to a new revision of a memory object based on the current tag.

It is a further technical advantage of the invention that object revisions can be rolled back to arbitrary points, without losing any versions.

It is a further technical advantage of the invention that the size of the tag field can be significantly smaller than the prior art indexed or time-stamp mechanisms. Note that the maximum tag field size is that which will support the maximum tag value.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis or modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

For N unique stored objects, a set of N+2 unique tags are created such that each tag, except the null tag, has both a unique predecessor tag, as well as a unique successor tag, effectively forming a cyclic relationship. Note that given N stored objects, and assuming that all are tagged, then there are two unused tags from the original N+2. One tag is the null tag for the start up state. This leaves one unused revision tag. The absence of this tag allows the determination of the state of the stored object. The most recent object revision will be the one for which no successor tag is found. The oldest object revision will be the one for which no predecessor tag is found. Note that N separate storage areas of the memory are used to store the N versions of the object. The null tag is also used to identify/invalid/empty objects, i.e., given "N" storage locations, not all "N" may be initially valid or assigned.

Figure 1:
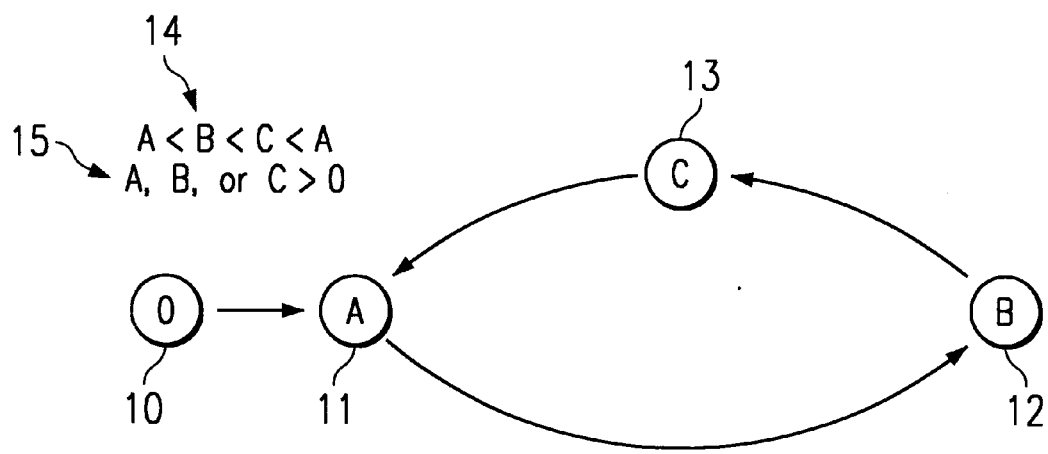
FIG. 1 depicts the inventive state mechanism having four states.

FIG. 1 depicts the inventive state mechanism used by a memory management controller (not shown) to store two revisions of an object. Since two revisions are to be stored, then a total of four states or tags are required. These states are labeled tag 0 10, tag A 11, tag B 12, and tag C 13. Tag 0 10 is the null tag or uninitialized tag, which indicates a start up state of the application or system. Typically, such a state contains garbage or uninitialized values in the location. The memory management controller would locate and load the most recent and complete version of the object, in this case A 11. The revision with tag A 11 is considered the initial state or value. Note that any of tags A, B, or C could indicate the initial state, as any of those states would have precedence over revision 0 state, as indicated by precedence statement 15. The initial state depends upon the most recent tag value stored. Note that during the initialization, the memory management controller would review the existing revisions and determine which revision is the most recent. For example the version with tag A 11 may be the most recent revision. Then a subsequent revision would be assigned B 12. A further subsequent revision would be assigned C 13. The next revision would be assigned A 11, and so on. Note that the tag is stored with its associated revision of the object in the memory storage area.

Note that three physical areas of storage are not used, only two storage areas are required. Each subsequent revision is stored into the oldest revision. Table 1 describes this situation. Consider two revision storage areas for an object, namely, Area1 and Area2. At time t1, both storage areas hold uninitialized values having null tags 0 10. At a later time t2 the first revision of the object arrives and is given the first available highest precedence tag, tag A 11. Still later, at time t3, the second revision of the object arrives and is given the next tag in cyclic order, i.e., tag B 12. The next object revision arriving at time t4 receives the tag code tag C 13. The object revision at t5 is assigned the next highest precedence tag, tag A 11. Therefore, tag code assignment to an object revision is such that the last assigned tag yields precedence to the new tag associated with the new object version. Similarly, the newest object revision can be determined by the object revision having the highest tag that precedes current available highest tag in order of precedence.

TABLE 1

| time | Area1 | Area2 |
|------|-------|-------|
| t1 | 0 | 0 |
| t2 | A* | 0 |
| t3 | A | B* |
| t4 | C* | B |
| t5 | C | A* |

*most current object revision

Creating a new object revision is a two step process. If no empty storage locations are available, the oldest object revision must be voided. In other words, the storage associated with the oldest revision is over written with the newest version and its associated tag. The null tag is used to invalidated the associated object storage. After the storage has been voided, it is replaced with the new object revision. The new revision is assigned the successor tag to the current revision, which had been the previous unused tag. The tag previously associated with the oldest revision now becomes the unused tag. This process is performed by the memory management controller. Note that the cyclic tags are explicitly recycled, and thus can be used for unlimited number of times. The cyclic nature of the tag codes allow the reuse of tag codes in order of precedence. Thus, the cyclic tag codes are unbounded. The tag field for object storage has the advantage of using less memory space than prior art mechanisms, e.g. two storage areas at N+2 equals four tags, which would be written as two bits. Thus, the tag field would have a size limit of two bits, however, this limitation is overcome by the recycling.

The memory management controller determines which tag, and hence which revision, is the most current according to the precedence statement 14. As shown in FIG. 1, tag B has precedence over tag A, tag C has precedence over tag B, and tag A has precedence over tag C. Note that tags A, B, and C, have precedence over tag 0, as shown by precedence statement 15. Thus the unused tag will determine which tag has precedence. For example, if tag A is the unused tag, meaning that tags B and C are assigned to revisions, then tag C has precedence and indicates the most recent revision. Thus, the tag earlier in precedence to the unused tag indicates the most recent revision. Also note that the unused tag is also the tag that will be assigned to the next revision. Further, note that the tag later in precedence to the unused tag indicates the least recent revision.

Figure 2A:
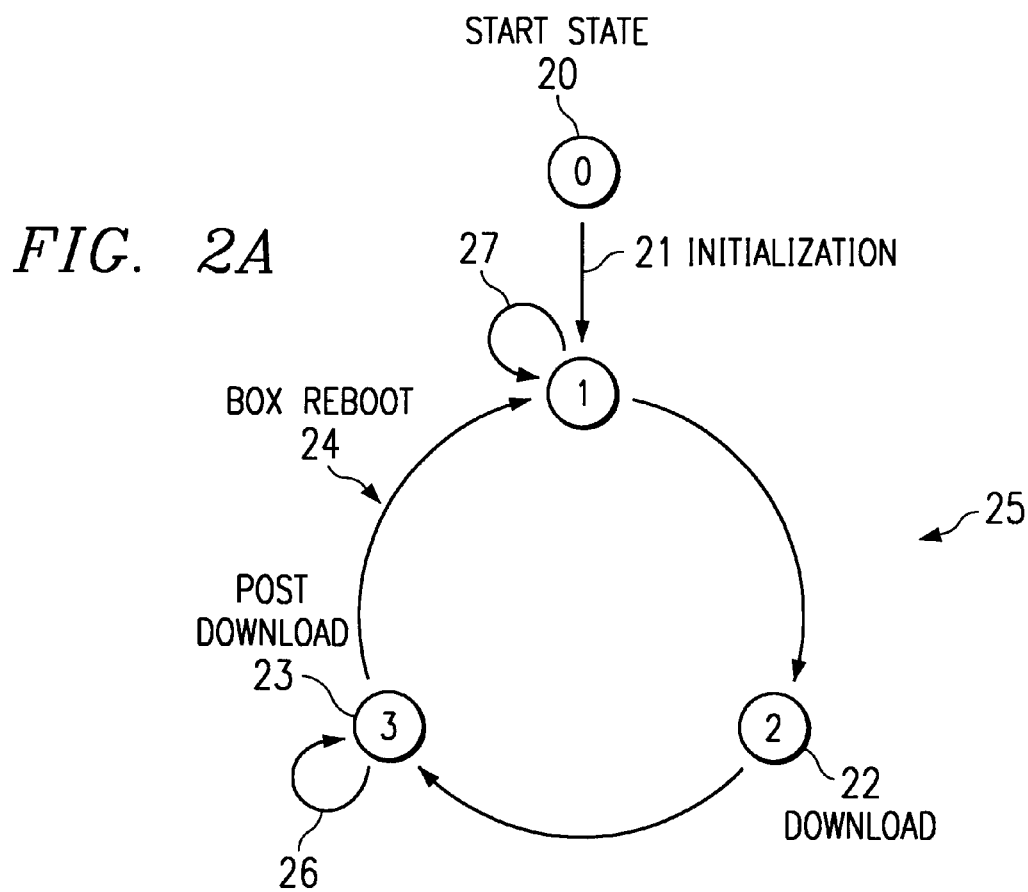
FIGS. 2A and 2B depict another embodiment of the inventive state mechanism having four states in two storage banks.
Figure 2B:
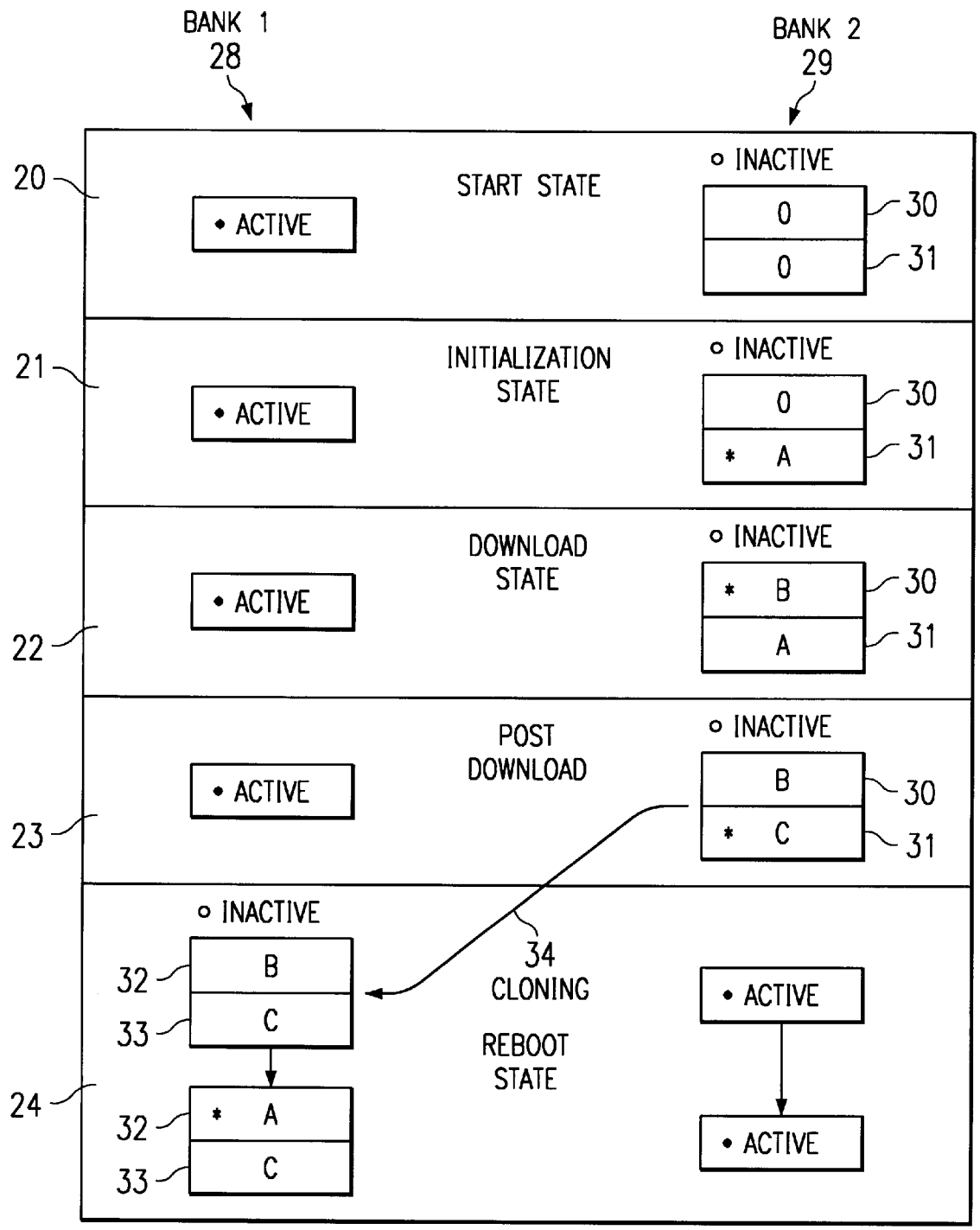

FIGS. 2A and 2B depict another embodiment of the invention. FIG. 2A depicts the changes of state 25 during the downloading of firmware. FIG. 2B depicts the contents of the two banks 28, 29 during the changes of state. Note that there are two storage areas 32, 33 in bank 1 or N=2 storage areas, and there are two storage areas 30, 31 in bank 2 or N=2. One bank is active, and the other is inactive. Revisions or changes can be made to the contents of the inactive bank, while the contents of the active bank cannot be revised. Note that the * symbol shown in FIG. 2B indicates the most recent revision or update in the storage areas. The inventive mechanism has four main states, state 0 20, state 1 21, state 2 22, and state 3 23. The reboot state 24 represents an event which triggers a change in the active bank, as well as a return to the initialization state 21. Thus, the reboot state 24 shown in FIG. 2B has passed through the start state 20 and is now in the initialization state 21. In this embodiment, movement among the main states is contingent upon external events, such as a download of new firmware or a reboot of the system. Note that updates or changes to the revising do not incur changes in state at the level depicted in FIGS. 2A and 2B. Note that the movement between states could be contingent upon other circumstances, both internal and external to the memory system, for example a variable stored in a register wherein changes in state corresponds to changes to the variable.

The uninitialized or start up state 0, is similar to tag 0 of FIG. 1. Upon initialization, the memory management controller moves into state 1 21, and writes tag A into the most current revision of the object, which is stored in the second storage area 31 of bank 2 29. Note that bank 1 28 is the active bank, the contents stored therein are being used by the system and cannot be changed. The initial contents of area 31 are a duplicate of the contents of area 30. As subsequent updates 27 are made to the version stored in area 31, each revision receives tag A. The changes can be initiated by a user or a system event. The updates are stored in a stack mechanism (not shown). Thus, the most recent revision is on top of the stack. Alternatively, the cyclical tag mechanism of FIG. 1 could be used instead of the stack. Thus, the first update would receive a tag of AA, the second revision would receive a tag of AB, and the next revision would receive a tag of AC. Note that in accordance with FIG. 1, AA<AB<AC<AA. The memory management controller would remain in state 1 21 until an event causes it to move into state 2 22.

When the change of state event occurs, for example, the downloading of new firmware into bank 2 29, then the memory management controller would move into state 2 22. Any values associated with the download state are loaded in storage area 30 and assigned the tag B, the next tag of the cyclical sequence, as shown in FIG. 1. Thus, area 30 now holds the most recent version of the values of the object. Area 30 is overwritten because it has the lowest precedence, and thus the oldest version. Note that the new firmware will not be used until the system is rebooted. The tag A is still maintained as the tag of the contents of area 31.

State 3 23 is the post download state. The contents of bank 2 29 can be changed, since bank 2 29 is the inactive bank. New revisions of the object stored in area 30 will be stored in area 31. Area 31 is overwritten because it has the lowest precedence, and thus the oldest version. As updates are made to the version stored in area 31, each revision receives a tag C, the next tag of the cyclical sequence as shown in FIG. 1. The changes can be initiated by a user or a system event. The updates are stored in a stack mechanism (not shown). Thus, the most recent revision is on top of the stack. Alternatively, the cyclical tag mechanism of FIG. 1 can be used instead of the stack. Thus, the first update would receive a tag of CA, the second revision would receive a tag of CB, and the next revision would receive a tag of CC. Note that in accordance with FIG. 1, CA<CB<CC<CA. The memory management controller would remain in state 3 23 until an event causes it to move into state 1 21.

The reboot state 24 is entered by the memory management controller during a restart or re-boot procedure. Note that the system starts in the uninitialized state 0 at each reset of the system, and then moves into the initialization state 1 21 (not shown). However, since new firmware has been downloaded, other events occur. In particular, the active bank changes from bank 1 28 to bank 2 29. The contents of bank 2 29 are cloned 34 into bank 1 28, which includes two storage areas 32 and 33. Initially, the storage areas have the same values and tags as those in bank 2 29. The first change or update to the values stored in area 33, which has the higher precedence tag and the most recent revisions, are stored into area 32 and assigned tag A, the next tag of the cyclical sequence as shown in FIG. 1. Area 32 is overwritten because it has the lowest precedence, and thus the oldest version. As additional updates are made to the version stored in area 32, each revision receives a tag A. The updates are stored in a stack mechanism (not shown). Thus, the most recent revision is on top of the stack. Alternatively, the cyclical tag mechanism of FIG. 1 can be used instead of the stack. Thus, the first update would receive a tag of AA, the second revision would receive a tag of AB, and the next revision would receive a tag of AC. Note that in accordance with FIG. 1, AA<AB<AC<AA. The memory management controller would remain in state 1 21 until an event causes it to move into state 2 22.

The inventive state mechanism can be used to maintain operational parameters and event log information in a FLASH memory system for an embedded I/O subsystem device. The state mechanism can be used to manage two storage repositories each with two separate storage areas. The inventive state mechanism can also be used in managing multiple parameter sets for PC BIOS initialization operations. For example, most PCs have a single, standard default parameter set that can be restored by a user. The inventive mechanism would allow for more than one parameter set to be available which could be established as the default set. This would allow customizing systems based on the end user (e.g. technical, administrative, business, server).

Although the present invention and its advantages have been described in detail, it should be understood that various changes, substitutions and alterations can be made herein without departing from the spirit and scope of the invention as defined by the appended claims.

What is claimed is:

1. A method for maintaining N revisions of an object stored in M areas of a memory, wherein the method uses at least N+1 tags to label each revision such that one tag is an unused tag, the method comprising the steps of:

associating the tags in a sequence to each revision as each revision is stored in an area of the M areas, wherein the tags have a particular order of precedence such that a subsequent tag of the sequence has a higher precedence than its predecessor tag, wherein the first tag of the sequence has a higher precedence than the tag N+1 of the sequence;

determining the most recent revision based upon the unused tag; and determining the next tag of the sequence of tags based upon the unused tag.

2. The method of claim 1, wherein the method includes a null tag assigned to an uninitialized state of the memory.

3. The method of claim 1, wherein tag X of the sequence of tags is the unused tag, the step of determining the most recent revision comprises the step of:

determining the revision associated with the tag X−1.

4. The method of claim 1, wherein less than N revisions are stored in the memory, and tag X of the sequence of tags is the lowest precedence unused tag, the step of determining the most recent revision comprises the step of:

determining the revision associated with the tag X−1.

5. The method of claim 1, wherein tag X of the sequence of tags is the unused tag, the step of determining the next tag of the sequence comprises the step of:

designating tag X as the next tag.

6. The method of claim 1, wherein less than N revisions are stored in the memory, and tag X of the sequence of tags is the lowest precedence unused tag, the step of determining the next tag of the sequence comprises the step of:

designating tag X as the next tag.

7. The method of claim 1, further comprising the step of:

determining the least recent revision based upon the unused tag.

8. The method of claim 7, wherein tag X of the sequence of tags is the unused tag, the step of determining the least recent revision comprises the step of:

determining the revision associated with the tag X+1.

9. The method of claim 7, wherein another revision has occurred, the method further comprising the steps of:

voiding the least recent revision; and storing said another revision in the area previously occupied by the least recent revision.

10. The method of claim 9 further comprising the steps of:

assigning the next tag of the sequence to said another revision; and storing the next tag along with said another revision.

11. The method of claim 9 wherein the method includes a null tag, wherein the step of voiding comprises the step of:

assigning the null tag to the least recent revision.

12. The method of claim 1, wherein:

the memory is a non-volatile memory.

13. The method of claim 1, wherein:

the memory is a flash memory.

14. A tag algorithm for maintaining N revisions of an object stored in M areas of a memory, the tag algorithm comprises:

at least N+1 tags which are associated with the revisions such that one tag is an unused tag;

wherein the tags are in a sequence in order of precedence, such that a subsequent tag of the sequence has a higher precedence than its predecessor tap, and the first tag of the sequence has a higher precedence than the tag N+1.

15. The tag algorithm of claim 14, wherein the mechanism further comprises:

a null tag assigned to an uninitialized state of the memory.

16. The tag algorithm of claim 14, wherein:

the most recent revision is determined from the unused tag; and the next tag of the sequence of tags is determined from the unused tag.

17. The tag algorithm of claim 16, wherein:

tag X of the sequence of tags is the unused tag; and the revision associated with tag X−1 is the most recent revision.

18. The tag algorithm of claim 16 wherein less than r4 revisions are stored in the memory, and wherein:

tag X of the sequence of tags is the lowest precedence unused tag; and the revision associated with tag X−1 is the most recent revision.

19. The tag algorithm of claim 16, wherein:

tag X of the sequence of tags is the unused tag; and tag X is the next tag of the sequence.

20. The tag algorithm of claim 16, wherein less than N revisions are stored in the memory, and wherein:

tag X of the sequence of tags is the lowest precedence unused tag; and tag X is the next tag of the sequence.

21. The tag algorithm of claim 14, wherein:

the least recent revision is determined from the unused tag.

22. The tag algorithm of claim 21, wherein:

tag X of the sequence of tags is the unused tag; and the revision associated with tag X+1 is the least recent revision.

23. The tag algorithm of claim 21 wherein:

another revision has occurred;

the least recent revision is voided; and said another revision is stored in the area previously occupied by the least recent revision.

24. The tag algorithm of claim 23, wherein:

the next tag of the sequence is assigned to said another revision; and the next tag is stored along with said another revision.

25. The tag algorithm of claim 14, wherein:

the memory is a non-volatile memory.

26. The tag algorithm of claim 14, wherein:

the memory is a flash memory.

* * * * *